(12) United States Patent
Bhagavatula et al.

(10) Patent No.: US 6,404,964 B1
(45) Date of Patent: Jun. 11, 2002

(54) DISPERSION MANAGED OPTICAL WAVEGUIDE AND SYSTEM WITH DISTRIBUTED AMPLIFICATION

(75) Inventors: Venkata A. Bhagavatula, Big Flats; Alan F. Evans, Beaver Dams, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/674,416

(22) PCT Filed: Apr. 14, 1999

(86) PCT No.: PCT/US99/08157

§ 371 (c)(1), (2), (4) Date: Oct. 30, 2000

(87) PCT Pub. No.: WO99/57822

PCT Pub. Date: Nov. 11, 1999

Related U.S. Application Data (60) Provisional application No. 60/083,980, filed on May 1, 1998.

(51) Int. Cl.[7] ............................. G02B 6/16; H01S 3/30; H01S 3/00
(52) U.S. Cl. .................. 385/123; 385/24; 385/122; 372/6; 359/341
(58) Field of Search .................. 385/123, 100, 385/122, 124, 24; 372/6; 359/341

(56) References Cited

U.S. PATENT DOCUMENTS

| 5,058,974 | A |   | 10/1991 | Mollenauer | 385/27 |
|---|---|---|---|---|---|
| 5,448,674 | A | * | 9/1995 | Vengsarkar et al. | 385/123 |
| 5,838,867 | A | * | 11/1998 | Onishi et al. | 385/123 |
| 5,880,877 | A | * | 3/1999 | Fermann et al. | 359/341 |
| 5,887,093 | A | * | 3/1999 | Hansen et al. | 385/27 |
| 5,894,537 | A | * | 4/1999 | Berkey et al. | 385/123 |
| 5,905,838 | A | * | 5/1999 | Judy et al. | 385/123 |
| 6,014,249 | A | * | 1/2000 | Fermann et al. | 359/341 |
| 6,163,398 | A | * | 12/2000 | Inagaki et al. | 359/341 |

FOREIGN PATENT DOCUMENTS

| EP | 0 590 633 | 4/1994 | 385/123 X |
|---|---|---|---|
| EP | 0 730 354 | 9/1996 | 385/123 X |
| EP | 0 734 105 | 9/1996 | 385/123 X |
| EP | 0 737 873 | 10/1996 | 385/123 X |
| WO | 9706457 | 2/1997 | 385/123 X |

OTHER PUBLICATIONS

V.A. Bhagavatula et al., "Novel Fibers for Dispersion–Managed High–Bit–Rate Systems", Optical Fiber Communication '98, Technical Digest Conference Edition, 1998 OSA Technical Digest Series vol. 2, Feb. 22–29, 1998, pp. 21–22.

* cited by examiner

*Primary Examiner*—Brian Healy
(74) *Attorney, Agent, or Firm*—Robert L. Carlson (57) ABSTRACT

A unitary dispersion managed waveguide fiber with distributed amplification and a system incorporating the waveguide fiber are disclosed. Total dispersion along the waveguide fiber changes from positive to negative along the length of the waveguide over a transmission wavelength range. Distributed amplification is provided by stimulated emission of a dilute concentration of a rare earth dopant in the waveguide, by Raman effects or by both.

39 Claims, 5 Drawing Sheets

DISPERSION MANAGED OPTICAL WAVEGUIDE AND SYSTEM WITH DISTRIBUTED AMPLIFICATION

This application claims the benefit of U.S. Provisional Application No. 60/083,980, filed May 1, 1998.

FIELD OF THE INVENTION

This invention relates to information transmission using optical waveguides. More particularly, this invention pertains to the design of a dispersion managed optical waveguide fiber with distributed amplification and a system utilizing the waveguide fiber.

BACKGROUND OF THE INVENTION

The introduction of multigigabit, multiwavelength lightwave communications systems having long unrepeatered distances and high average powers has resulted in the exploration of fiber designs that can minimize signal degradation. Fibers in such systems typically have losses in the range of about 0.22 to 0.30 db/km. To increase bandwidth, fibers need to be redesigned to reduce a number of nonlinear and polarization effects that become increasingly important at high bit rates and high powers.

Wavelength division multiplexing increases the data transmission rate over an optical waveguide fiber by multiplexing several channels onto single fiber, with each channel operating at a different wavelength. Four wave mixing is a non-linear interaction between channels in wavelength division multiplexed (WDM) systems, and four wave mixing severely impacts system design and operating characteristics of the fiber. Of interest is a waveguide design that can substantially eliminate four wave mixing. To substantially eliminate four wave mixing, the waveguide fiber should not be operated near its zero of total dispersion, because significant four wave mixing occurs when the absolute magnitude of total dispersion is low, i.e., less than about 0.5 ps/nm-km. On the other hand, signals having a wavelength away from the zero of total dispersion of the waveguide are degraded because of the non-zero total dispersion. As used herein, the term total dispersion means the sum of the material dispersion and the waveguide dispersion.

One strategy proposed to overcome this dilemma is to incorporate into existing single mode fiber system appropriately placed dispersion compensating waveguide fiber lengths, some of which have a positive total dispersion and some of which have a negative total dispersion over the operating wavelength range. If the length weighted average of dispersion for all the cable segments is close to zero, the regenerator spacing and the system length can be large. However, the signal essentially avoids passing through a waveguide length where the dispersion is close to zero, so that four wave mixing is substantially reduced.

The problem with this strategy, which uses discrete individual lengths of dispersion compensating fibers, is that each link between regenerators must be tailored to give the required length weighted average of dispersion. Maintaining cable dispersion identity from cabling plant through to installation is an undesirable added task and source of error. Further, the need to provide not only the proper dispersion, but also the proper length of cable having that dispersion, increases the difficulty of manufacture and leads to increased system cost. Another problem arises when one considers the random lengths and dispersions that might be needed for replacement cables. In addition, the steadily increasing demand for bandwidth will eventually strain the capabilities of dispersion-compensated standard fiber systems.

U.S. Pat. No. 5,611,016, issued to Fangmann et al., discloses a dispersion balanced cable having one or more optical fibers, the cable including a first optical fiber having a positive chromatic dispersion and a second optical fiber having a negative chromatic dispersion at a transmission wavelength. This approach, however, shares some of the same problems mentioned above for inserting dispersion compensating fibers in standard single mode systems. In addition, the approach in U.S. Pat. No. 5,611,016 requires splicing together separate positive dispersion fibers to negative dispersion fibers, introducing splice losses.

U.S. patent application Ser. No. 08/584,868, filed on Jan. 11, 1996, issued as U.S. Pat. No. 5,894,537, the entire contents of which are incorporated by reference, suggests overcoming these problems by making each individual fiber a self-contained dispersion managed system. A specified, i.e., pre-selected, length-weighted average of total dispersion, i.e., total dispersion product, is designed into each waveguide fiber. Thus, the cabled waveguide fibers all have essentially identical dispersion product characteristics and there is no need to assign a particular set of cables to a particular part of the system.

These dispersion managed fibers may be used in non return to zero (NRZ) systems for multiwavelength WDM systems, as well as high bit rate multi-wavelength soliton systems. Soliton transmission in dispersion flattened fibers is described in U.S. Pat. No. 5,579,428, issued to Evans et al., the content of which is incorporated by reference. Such soliton systems, however, introduce additional requirements on the fibers and systems. For example, for high bit rate soliton systems with discrete, lumped amplifiers, amplifier spacing can become too small to be practical.

Distributed fiber amplifiers have been considered in standard single mode fiber systems to address the above-mentioned problem associated with lumped amplifier spacing, and also to improve signal to noise in lightwave transmission systems. Distributed fiber amplifiers provide gain by stimulated Raman scattering or by using fiber dopants such as $Er^{3+}$. U.S. Pat. No. 5,058,974 discloses a distributed amplification scheme wherein a dilute concentration or a rare-earth dopant is included substantially in the core region of a long length of optical fiber and a corresponding pump signal generator located at one or both ends of the doped fiber having an appropriate wavelength and power to cause amplification of optical signals by both Raman effects and stimulated emission from the rare-earth dopants. One disadvantage with the fiber disclosed in U.S. Pat. No. 5,058,974 is that introducing dopants in the core of the fiber requires low concentrations of the dopant which may be difficult to control. Erbium doped distributed amplifiers and methods of making such amplifiers are described in the literature. B. James Ainslie, "A Review of the Fabrication and Properties of Erbium-Doped Fibers for Optical Amplifiers," Journal of Lightwave Technology, Vol. 9, No. 2, February 1991.

However, one disadvantage of distributed amplification in standard single mode fibers is that a single refractive index profile optimized for zero or near zero dispersion at about 1530–1550 nm is needed. Because of the smaller modefield diameters and effective area of such designs, dopants near the fiber center and in very low concentrations of around a few parts per million are generally preferred. Such low doping concentrations are difficult to control. In addition, the addition of aluminum to the center of such designs for gain flattening can introduce high losses.

There is a distinct need for a unitary waveguide fiber and system designed as a self-contained dispersion managed system, which incorporates distributed amplification. Dispersion managed fibers are excellent host fibers for distributed amplification utilizing rare-earth dopants because such fibers, which usually include a segmented core design having several annular core regions, provide a variety of radial locations to place the dopants. Such a fiber and system would not only compensate for dispersion and non-linear effects such as four-wave mixing, but would also compensate for loss and improve transmission by having built-in amplification. Such a fiber and system would meet the demand for greater information carrying capacity on new fiber systems.

SUMMARY OF INVENTION

The present invention addresses the problems mentioned above by providing a unitary dispersion managed optical waveguide fiber, preferably a single mode fiber, designed to provide distributed amplification. The waveguide fiber comprises a core glass region having a refractive index profile, surrounded by a clad glass layer having a refractive index $n_c$ lower than at least a portion of the refractive index profile of the core glass region. The single mode waveguide fiber of the invention has a total dispersion, which changes in sign from positive to negative and negative to positive along the length of said waveguide over the transmission (operating) wavelength range. The operating wavelength range is preferably greater than 4 nm, more preferably greater than 10 nm, and most preferably greater than 20 nm. In one embodiment, the average absolute magnitude of the dispersion in the positive dispersion sub-lengths and the negative dispersion sub-lengths is greater than 0.5 ps/nm-km. It will be understood that the waveguide fiber of the present invention is a unitary fiber including positive dispersion sections and negative dispersion sections without splices or connectors between the positive and negative sections. A particular operating wavelength range of interest includes the erbium amplification window, which is from about 1530 nm to about 1620 nm. An extended operating wavelength ranges include about 1285 nm to about 1620 nm, where other amplification could be utilized, such as Raman amplification.

In one specific embodiment, the waveguide fiber is made up of sub-lengths $I_i$ and $I_j$, and optionally, sub-lengths $I_t$, the sum of all $I_i$, all $I_j$, and all optional $I_t$ sub-lengths being equal to the waveguide fiber length. The sub-lengths $I_i$ are comprised of segments $dI_i$, with each $dI_i$ having a total dispersion $D_i$ which lies in a first range of values of a pre-selected sign, and the dispersion product of sub-length $I_i$ is characterized by the sum of products $D_i*dI_i$. The sub-lengths $I_j$ comprised of segments $dI_j$, with each $dI_j$ having a total dispersion $D_j$ which lies in a second range of values of sign opposite to the sign of $D_i$, and the dispersion product of $I_j$ is characterized by the sum of products $D_j*dI_j$. Thus, if the dispersion product of the sub-lengths $I_i$ is positive, the dispersion product of the sub-lengths $I_j$ would be negative.

Optional sub-lengths $I_t$ are transition sub-lengths over which the total dispersion changes from a value in the first range of dispersion values to a value in the second range of dispersion values, for example, from positive to negative or negative to positive. It will be understood, that the transition sub-length $I_t$ may be less than about 0.1 km, and may simply include a region between a sub-length $I_i$ and a sub-length $I_j$ over which the total dispersion changes from positive to negative. Alternatively, the transition sub-length $I_t$ may be a length of fiber specifically placed between $I_i$ and $I_j$ to provide a longer region over which the total dispersion changes from positive to negative. According to the present invention, the absolute value of the algebraic sum of all products $dI_i*D_i$ and $dI_j*D_j$ is greater than a pre-selected value, over a predetermined wavelength range R. At least one of the sub-lengths $I_i$, $I_j$ and $I_t$, contains a dilute concentration of rare-earth dopant ions sufficient to provide distributed amplification by either stimulated emission, or at least one of these sub-lengths is optimized for efficient, distributed Raman amplification. Alternatively, a fiber length could include some sub-lengths that contain a dilute concentration of a rare-earth dopant and some-sub-lengths that are optimized for distributed Raman amplification. In embodiments in which amplification is provided by rare-earth doping, a concentration of at least about 50 ppm of rare earth dopant is sufficient to provide amplification.

As used herein, a fiber designed for a distributed amplification system refers to a fiber which is designed to provide amplification of a transmitted signal by either Raman effects or stimulated emission of a rare-earth dopant. According to the present invention, in a unitary fiber designed for a distributed amplification system, all of the sub-lengths in a fiber need not be designed for amplification. Instead, the positive dispersion sub-lengths, the negative dispersion sub-lengths, the transition sub-lengths, or a combinations of these sub-lengths may be designed to provide amplification of the transmission signal.

According to one embodiment of the present invention, the rare-earth dopant ions include erbium. According to another embodiment, the concentration of said dopant ions is substantially uniform over the length of said waveguide fiber. In another aspect of the invention, only one of the sub-lengths $l_i$ or $I_j$ or $I_t$ contains said rare-earth dopant ions. In still another aspect, the refractive index profile of sub-lengths $I_i$ is different from the refractive index profile of sub-lengths $I_j$, and the radial position of the dopant ions in sub-lengths $I_i$ is different from the radial position of the dopant ions in sub-lengths $I_j$.

According to another embodiment, the dispersion managed fiber of the present invention may be designed for use in a telecommunication system using soliton signal pulses. In an embodiment in which the fiber is designed for transmission of soliton pulses, stimulation of the dopant ions causes amplification of said signal pulses so that the peak intensity of said signal pulses is controlled to, for example, dampen or enhance oscillations of the pulse width.

The invention also includes an optical system for transmitting a first lightwave signal at a first wavelength, the system including the dispersion managed fiber of the present invention and a first pump source at a second wavelength for stimulating emission from the dopant ions at the first wavelength. In this embodiment, the first pump source is optically coupled to said optical waveguide fiber. In another embodiment, the system includes a second pump source at a third wavelength for stimulating Raman scattering, the second pump source being optically coupled to said waveguide fiber. By combining the provision for rare-earth amplification and Raman amplification, the system provides an expanded wavelength range for amplification. In another system embodiment, the dispersion managed fiber does not contain the dilute concentration of the rare-earth ion and Raman effects alone provide distributed amplification.

Several important advantages will be appreciated from the foregoing summary. One advantage of the present invention is that for a dispersion managed fiber having distributed amplification, different waveguide designs with different refractive index profiles can be utilized within the same fiber length to allow an additional degree of freedom in optimizing amplification. For example, the rare-earth doping can be placed in one or both sections and at different radial positions within the fiber. Some fiber designs would likely include refractive index profiles having large effective areas, preferably larger than about 50 square microns. Optimization of amplification parameters such as gain flattening is easier to accomplish with large effective area designs because the aluminum may be placed away from the centerline of the fiber, potentially reducing losses. In addition, since the rare-earth dopant can be placed away from the centerline of the fiber, higher dopant concentrations may be used, which will be easier to control. As used herein, the term "effective area" of a fiber is determined by the equation:

$A_{eff}=2\pi(\int E^2 r\, dr)^2/(\int E^4 r\, dr)$, where the integration limits are 0 to $\infty$, r is radius of the light transmitting region, and E is the electric field associated with the propagated light. Large effective area fiber designs and methods are disclosed in U.S. Pat. Nos. 5,684,909 and 5,715,346, which are incorporated by reference. Generally, such fibers include a glass core comprising multiple segments, each segment being characterized by a refractive index profile, an outside radius, and a $\Delta\%$, wherein $\Delta\%$ is the percent index change, which is equal to $[(n_1^2-n_c^2)/2n_1^2]\times 100$, where $n_1$ is the core index and nc is the cladding index.

Additional features and advantages of the invention will be set forth in the description which follows. It is to be understood that both the foregoing general description and the following detailed description are exemplary and explanatory and are intended to provide further explanation of the invention as claimed.

The accompanying drawings are included to provide a further understanding of the invention, and together with the following description provide specific illustrative embodiments of the invention. In the drawings, like reference characters denote similar elements throughout the several views.

DETAILED DESCRIPTION

Reference will now be made in detail to a present preferred embodiment of the invention, an example of which is illustrated in the accompanying drawings. The present invention combines the benefits of dispersion managed fiber and that of distributed amplification in a single fiber. The advantages of such a fiber include reduced four wave mixing due to high dispersion at the signal wavelengths and built in dispersion compensation using positive and negative dispersion sections, and optionally alternating dispersion slope, without any excess loss or polarization mode dispersion. Dispersion managed fiber segments also preferably include built in large effective area to further reduce four wave mixing and other nonlinear effects. The addition of the distributed amplification to the dispersion managed fiber of the present invention provides an additional feature of built-in amplification.

The present invention is directed to a waveguide fiber designed to provide distributed amplification in a signal transmission system, either through use of a dilute concentration of a rare-earth dopant or sections optimized for efficient, distributed Raman amplification, wherein the total dispersion product, expressed in ps/km, is managed over a waveguide fiber length. A dilute concentration could be as low as about 50 ppm to 100 ppm, but the appropriate concentration can be determined by system modeling. The invention also includes a system including the waveguide fiber wherein distributed amplification is provided by either stimulated emission of the dopant, Raman effects, or a combination of both. Doping dispersion managed fiber with a rare-earth dopant, such as erbium, provides flexibility to place different concentrations of the dopant in alternating sections of the dispersion managed fiber. Using dispersion managed fiber as the host for the amplifying dopant provides additional degrees of freedom versus standard single mode fiber to optimize amplification.

Managing dispersion within each individual fiber eliminates the need to select sets of waveguides which produce substantially zero dispersion when joined together to form a link in a system when discrete lengths of dispersion shifted fiber are used. Because total dispersion product is managed in the individual waveguide fiber, the cables being installed to form a system are essentially identical in performance, and therefore interchangeable. In addition, amplification can be optimized by independently setting the dopant inversion level, dopant concentration and gain in each sub-length of waveguide fiber.

Figure 1:
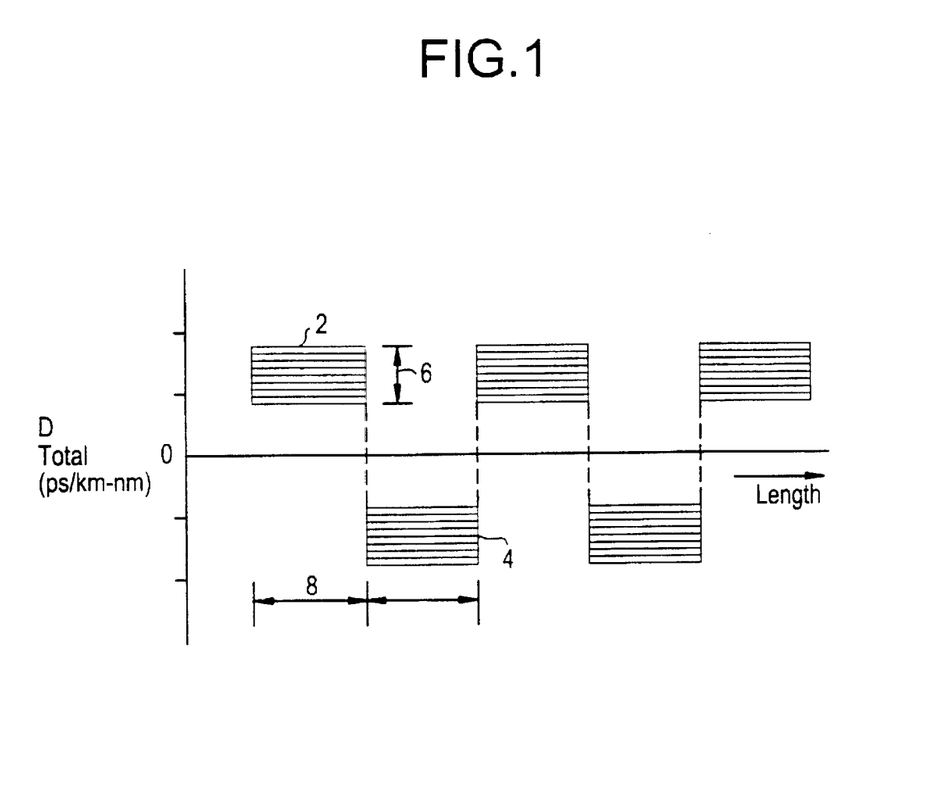
FIG. 1 is a chart illustrating alternating positive and negative dispersions along a dispersion managed waveguide fiber length.

A chart of the dispersion, expressed in ps/nm-km, versus waveguide length of an exemplary embodiment of the waveguide fiber of the present is shown in FIG. 1. The total dispersion is shown to alternate between positive values 2 and negative values 4. Although FIG. 1 illustrates a plurality of sub-lengths exhibiting negative dispersion and a plurality of sub-lengths exhibiting positive dispersion, only one negative dispersion sub-length and one positive dispersion sub-length are required. The spread in total dispersion values indicated by line 6 illustrates that total dispersion varies with the wavelength of light propagated. It will be understood that because the operating wavelength range of the fibers of the present invention can vary between about 1285 nm and 1620 nm, the dispersion will vary depending on the particular wavelength of light transmitted. The horizontal lines of the spread 6 represent total dispersion for a particular light wavelength. In general, the length of waveguide 8, characterized by a particular total dispersion is greater than about 0.1 km. There is essentially no upper limit on length 8, except one which may be inferred from the system considerations discussed below, as well as from the requirement that the sum of products, length multiplied by corresponding total dispersion, is equal to a pre-selected value.

Thus, according to a first aspect of the invention, the dispersion of the waveguide fiber varies between a range of positive values and a range of negative values along the waveguide length over the operating wavelength range. The dispersion product, expressed as ps/nm of a particular length (l) is the product of dispersion (D) in ps/nm-km multiplied by length (l) in km. A positive number of ps/nm will cancel an equal number of negative ps/nm. In general, the dispersion associated with a length $I_i$ may vary from point to point along $I_i$. That is, the dispersion $D_i$ lies within a predetermined range of dispersions, but may vary from point to point along $I_i$. To express the contribution of $I_i$ to the dispersion product, expressed in ps/nm, $I_i$ is made up of segments $dI_i$ over which the associated total dispersion $D_i$ is essentially constant. Then the sum of products of each $dI_i$ multiplied by its associated $D_i$ characterizes the dispersion product contribution of $I_i$.

The absolute values of $D_i$ and $D_j$ are held above 0.5 ps/nm-km to substantially prevent four wave mixing. Also, the length over which a given total dispersion persists is preferably greater than about 0.1 km.

Figure 2:
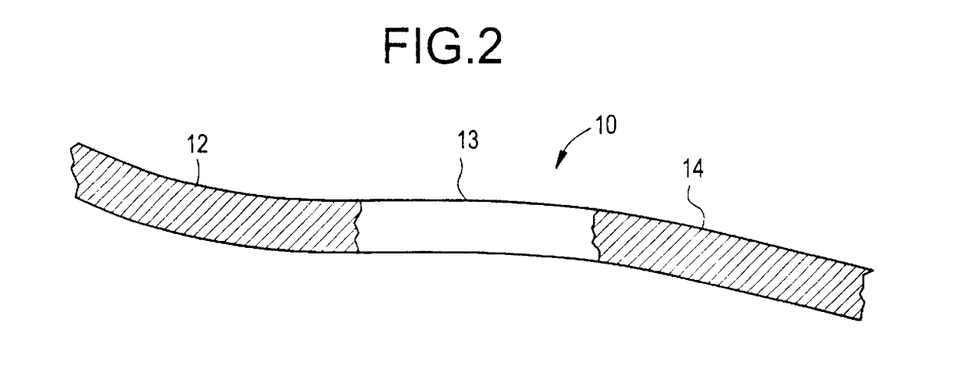
FIG. 2 is a simplified schematic diagram of one period of a waveguide fiber in accordance with the present invention.

Referring now to FIG. 2, each dispersion managed waveguide fiber includes a period 10. As used herein, a period is defined as a first length 12 having a total dispersion which is within a first range, plus a second length 14 having a dispersion which is in a second range, wherein the first and second ranges are of opposite sign, plus an optional length 13 over which the dispersion makes a transition between the first and second range. It will be understood, of course, that this optional transition length 13 may be a separate length placed between the first length 12 and the second length 14. Alternatively, the transition length 13 may consist of a short region over which the sign of the dispersion changes from positive to negative between the lengths 12 and 14, and would include an end portion of the first length 12 and a beginning portion of the second length 14. These three lengths are preferably adjacent. However, for ease of process control it is preferable that the three lengths are generally arranged as a first length 12, an adjacent transition length 13, followed by a second length 14 adjacent the transition length. To avoid four wave mixing and any associated power penalty over the transition length 13, it is advantageous to keep the part of the transition length 13 which has an associated total dispersion less than about 0.5 ps/nm-km as short as possible, preferably less than about 500 meters per transition and preferably no more than 10% of the period.

It will be understood that the length of a period will be determined by factors, such as bit rate, repeater span and installable cable length, as well as whether the fiber will be used for soliton transmission or NRZ systems. In any event, the period length can be determined by modeling or calculation. For example, in a 10 gigabit/second system, the length of a period can be up to about 100 km. In a 100 gigabit/second soliton system, the length of a period is preferably less than about 10 km, for example, 0.5 to 2 km.

Pending patent application Ser. No. 08/584,868, Berkey et al., issued as U.S. Pat. No. 5,894,537, as well as U.S. patent application Ser. No. 60/083,878, entitled, "Method of Making Optical Fibers," filed simultaneously herewith the specifications of which are both incorporated by reference into this application, disclose and describe dispersion managed waveguide fiber and methods for making the waveguide fiber. These methods can be utilized to make the fiber of the present invention. Those skilled in the art will understand that several alternative methods are available for making this novel dispersion compensating waveguide. These alternatives include but are not limited to outside vapor deposition, modified chemical vapor deposition, axial vapor deposition, and sol gel processes.

The dispersion of a waveguide can be changed by one of several methods including varying waveguide geometry, waveguide refractive index, waveguide refractive index profile, or waveguide composition. For example, a core preform made by any of the processes known to those skilled in the art, may be processed to have sections of reduced diameter. The sections of reduced diameter can be formed by, for example, heating and stretching one or more sections of the preform or by removing annular regions of the preform by a mechanical technique such as grinding and polishing, a chemical technique such as acid etching and polishing, or an energy bombardment technique such as laser ablation. The resulting core preform is then overclad by a method such as soot deposition or use of overcladding tubes to form a blank or preform having a uniform, substantially cylindrical outer surface, which can be drawn into waveguide fiber.

In one embodiment, waveguide fiber drawn from a draw blank or preform produced according to one of the above techniques, to have a core radius reduced over lengths corresponding to the reduced radius lengths in the core preform. A core diameter reduction of about 5% to about 25% is sufficient to produce the desired positive to negative dispersion variation. The 25% reduction would be needed only in cases where the absolute value of total dispersion is about 20 ps/nm-km. A range of radii variation of about 5% to about 10% is generally sufficient for most applications.

The core diameter variations may also be obtained by reducing segments of the diameter of a draw preform or blank having a substantially uniform diameter core portion, and then drawing the preform to a waveguide fiber having a uniform outer diameter. The waveguide core will have segments of decreased diameter corresponding to draw preform segments for which the diameter was not reduced.

Alternative methods of changing the dispersion of the waveguide include varying the refractive index profile of the core of the fiber along the waveguide length by irradiating the fiber with radiation in the electromagnetic spectrum such as ultraviolet light, or bombarding the waveguide with sub-atomic particles. An index difference greater than about $1 \times 10^{-3}$ is preferred.

The varying refractive index produces a varying total dispersion which allows the sum of products of $D_i*dI_i$ and $D_j*dI_j$ to be controlled. $D_i$ is a total dispersion corresponding to a first refractive index range in a first sub-length of fiber, and $D_j$ is a total dispersion corresponding to a second refractive index change in a second sub-length of fiber. $D_i$ and $D_j$ are opposite algebraic sign.

Other preferred methods of making dispersion managed waveguide fiber of the present invention are disclosed in U.S. patent application Ser. No. 08/844,997, filed on Apr. 23, 1997, Berkey, entitled, "Method of Making Optical Fibers," the content of which is incorporated by reference. The Berkey patent application discloses depositing a coating of cladding glass particles on the outer surface of a glass tube and placing a plurality of tablets into the cladding glass tube, wherein at least one of the optical characteristics of at least one of the tablets in the glass tube is different from an adjacent tablet. The tube containing the tablets is heated to a temperature below the sintering temperature of the particles on the tube, a gas such as chlorine is flowed through the tube and the tube is heated to sinter the particles and generate a radially-inwardly directed force that causes the tube to collapse and fuse to the tablets. The tube also shrinks longitudinally and the adjacent tablets are urged towards one another and fused together. Single mode dispersion managed fibers made by this method have attenuations typically less than about 0.35 db/km, and preferably about 0.21 dB/km and lower. This method is preferred because the tablets could be individually doped to allow flexibility in providing the amplifying dopant selected, the concentration of the dopant along the length of the fiber and the radial location of the dopant. This method is also preferred in embodiments in which the positive dispersion sub-lengths and the negative dispersion sub-lengths of the fiber have different refractive index profiles and different effective areas. For example, one of the positive dispersion sub-lengths could have a different number of core segments than the negative dispersion sub-lengths. Thus, the tablet method would provide an extremely flexible method of varying the properties of the core of a sub-length.

Any of a wide variety of refractive index profiles can provide the required flexibility for adjusting waveguide dispersion and thereby varying the total dispersion along the length of the fiber. Such profiles are disclosed in U.S. Pat. Nos. 4,715,679, 5,483,612, 5,613,027, 5,684,909, and 5,715,346, the contents of which are all incorporated by reference.

An exemplary set of index profiles that provides the properties necessary to the inventive waveguides are those having a core region which includes a central portion having a refractive index profile and at least one annular portion surrounding the central portion having a different refractive index profile. The annular portion is surrounded by a cladding. Optical fibers having this type of profile are referred to as segmented core fibers. The central portion may have an alpha profile, i.e., one which is described by the equation, $n(r)=n_0[1-\Delta(r/a)^\alpha]$, where n is refractive index, $n_0$ is maximum refractive index, r is the radial variable, a is fiber core radius, A is refractive index and $\alpha$ is a number greater than zero. The term A is defined as $(n_1^2-n_2^2)/2n_1^2$, where $n_1$ is the maximum refractive index of the core region and $n_2$ is the refractive index of the clad glass layer.

Several profiles which may be utilized are shown in FIGS. 1, 2a–2e, and 3 of U.S. Pat. No. 5,623,027. Such profiles are generally characterized as having a central core region surround by one or more annular regions, each of the regions having either a constant refractive index or a varying refractive index profile. Depending on the particular set of dispersion and other optical characteristics sought for the waveguide the surrounding annular regions may have either a lower or higher refractive index than the next inner adjacent region of the core. It will be understood that the present invention is not limited to a particular refractive index profile or set of profiles.

It will be understood that alternative refractive index profiles are within the scope of this invention. For example, for simplicity and ease of manufacture, the dispersion managed fiber of the present invention may have an index profile including an essentially constant central portion having a refractive index substantially equal to the clad glass refractive index, and the adjacent annular index portion is a rounded step index. Alternative profiles includes those in which portions of the core refractive index are lower than the cladding refractive index.

In one embodiment, a predetermined system operating range is about 1285 to 1620 nm, to provide for both Raman amplification and erbium amplification. The wavelength of Raman amplification will depend, of course, on the wavelength of the pump laser and the Raman shift of the material from which the fiber is made. Other preferred operating ranges are about 1525 nm to 1620 nm. The absolute magnitude of dispersion in either sub-length of waveguide fiber is preferably greater than about 0.5 ps/km-nm. In such a system, the communication signals will substantially always travel in a waveguide fiber of non-zero dispersion, at either a positive or negative value, over a transmission wavelength range, thereby substantially preventing four wave mixing. However, the overall system total dispersion may be held at essentially zero, so that little or no signal degradation occurs due to total dispersion. In one embodiment the transmission wavelength range preferably exceeds 4 nm, and in another embodiment the transmission wavelength range more preferably exceeds 10 nm, more preferably exceeds 20 nm.

Figure 3A:
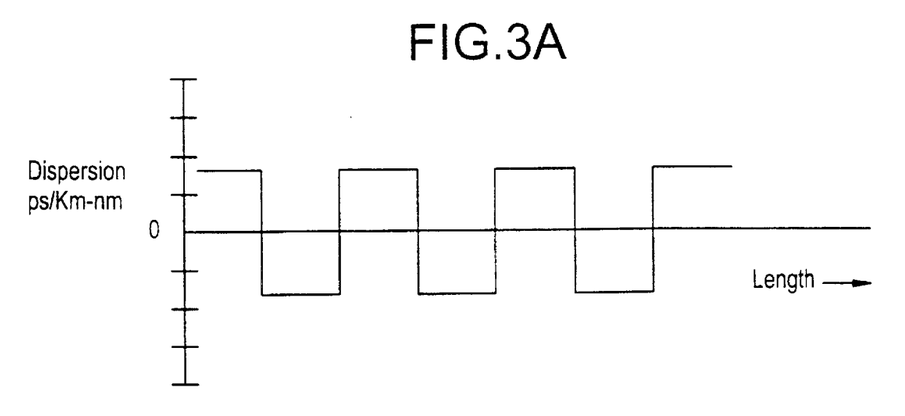
FIGS. 3a and 3b respectively show graphs of dispersion versus fiber length and dispersion slope versus fiber length.
Figure 3B:
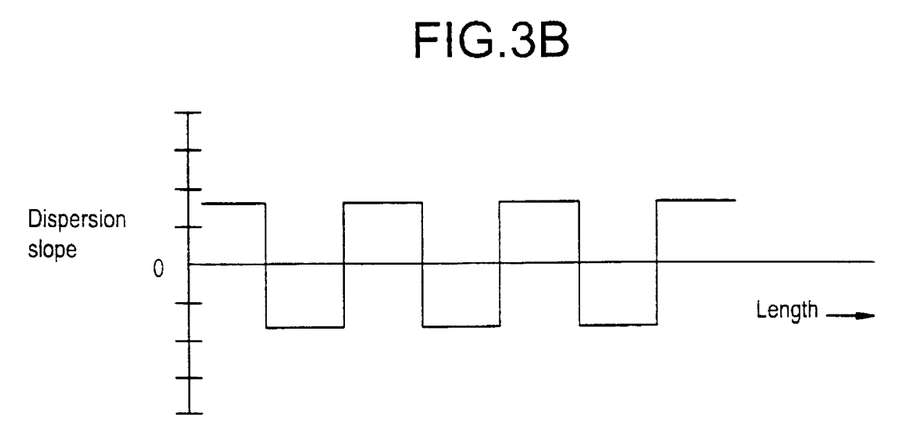

Referring now to FIGS. 3a and 3b, in another exemplary embodiment, not only does the dispersion between alternating sub-lengths of the waveguide fiber alternate between positive and negative values over the operating wavelength range, but the sign of the dispersion slopes also varies between alternating sections. In FIG. 3a, the y axis corresponds to dispersion, and the x axis corresponds to fiber length. In FIG. 3b, the y axis corresponds to dispersion slope and the y axis corresponds to fiber length. Preferably, as shown in FIG. 3b, for optimal performance in wavelength division multiplexed systems the sign of the slope should correspond to the sign of the dispersion, which will provide a broader system operating wavelength range. As used herein, dispersion slope is the slope of the dispersion versus wavelength curve, expressed ps/nm-km². In another preferred embodiment, the ratio of dispersion to dispersion slope in a positive dispersion section is approximately equal to the ratio of dispersion to dispersion slope in the negative dispersion section to balance dispersion over a wide wavelength range. This feature is particular advantageous for fibers used in soliton transmission.

In one embodiment of the present invention, distributed amplification is provided in the dispersion managed fiber by including a dilute concentration of a rare-earth dopant, such as $Er^{3+}$, and stimulating emission from the dopant. Distributed amplification may be provided by stimulated Raman scattering, wherein no dopant would be required to provide amplification, but the fiber is designed for efficient, distributed Raman amplification. Alternatively, a combination of Raman amplification and stimulated emission from a rare-earth dopant could provide distributed amplification.

Dilute concentrations of the rare-earth dopant can be placed in one or both alternating sections of the waveguide fiber, or at different radial locations for alternating sub-lengths within the fiber. In addition, in dispersion managed fibers having large effective area designs with a core having several annular segments, optimization of amplification parameters such as gain flattening using alumina co-doping is easier to accomplish. The large effective area designs of such fibers provides the flexibility to place the alumina away from the centerline of the fiber, potentially reducing losses. In addition, since the rare-earth dopant can be placed away from the centerline of the fiber, higher dopant concentrations may be used, which will be easier to control. The appropriate concentration and radial location of the dopant can be determined by experimentation or by modeling.

Figure 2A:
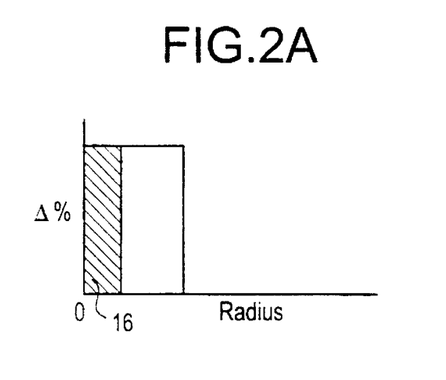
FIGS. 2a and 2b show graphs of %Δ versus radius for sub-lengths of the fiber shown in FIG. 2.
Figure 2B:
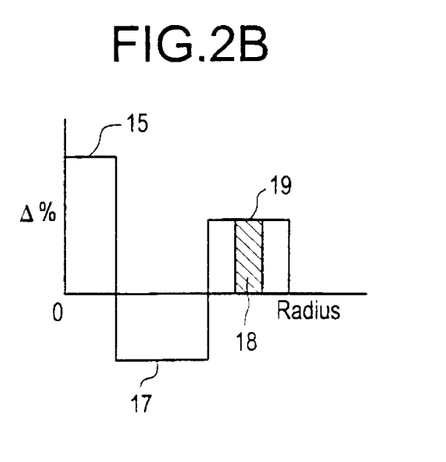

FIGS. 2a and 2b show an exemplary embodiment of flexibility in placing the rare earth dopant in various radial positions of the waveguide fiber of the present invention. FIGS. 2a and 2b show graphs of %Δ versus radius of the waveguide, wherein %Δ represents a relative measure of refractive index defined by the equation $\%\Delta=(n_r^2-n_c^2)/2n_r^2$, where nr is the maximum refractive index in a first region and $n_c$ is the refractive index in the region surrounding the first region. As shown in FIG. 2a, which corresponds to sub-length 12 in FIG. 2, rare-earth dopant is placed at location 16, approximately at the radial centerline of the waveguide fiber sub-length. In FIG. 2b, which corresponds to section 14 in FIG. 2, the waveguide fiber has a different refractive index profile, with a central core region 15 surrounded by annular region 17, which is surrounded by annular region 19. The rare-earth dopant is placed at location 18, away from the radial centerline of the waveguide fiber sub-length.

In another embodiment, it may be advantageous for waveguides used in soliton transmission to utilize distributed amplification in only the transition sections to achieve the maximum pulse energy enhancement factor, which would reduce pulse timing jitter. As used herein, energy enhancement factor means the increase in pulse energy needed for stable transmission in dispersion managed fiber in comparison to solitons transmitted over a constant dispersion fiber.

Figure 4:
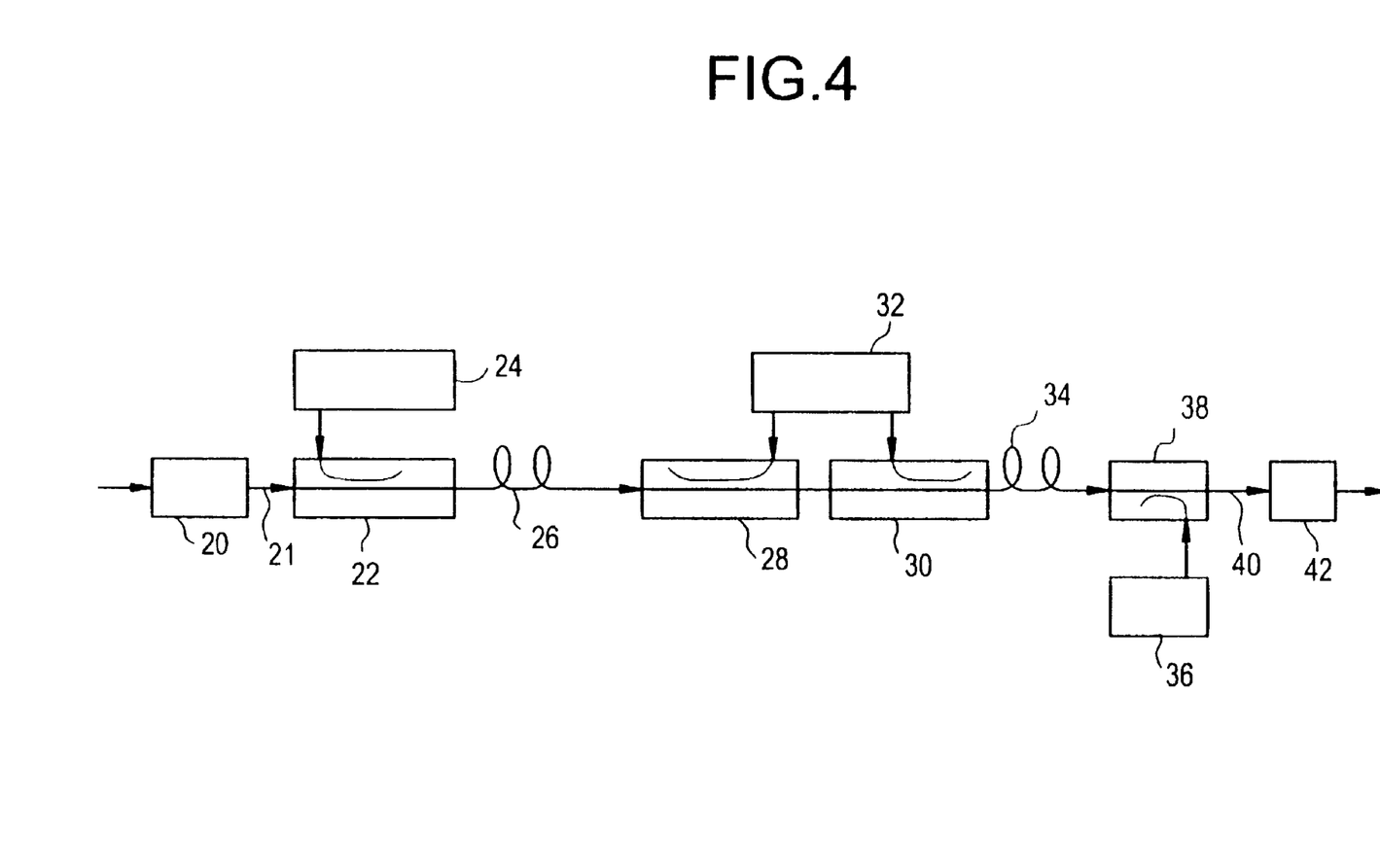
FIG. 4 is a schematic diagram of exemplary system utilizing the waveguide fiber of the present invention.

The invention further includes an optical system which utilizes the dispersion managed fiber of the present invention. An exemplary system is shown in FIG. 4. While only two links of dispersion managed fiber with distributed amplification are shown in FIG. 4, it will be understood that the number of links can be larger. Similarly, transmitter 20 is optically coupled to a waveguide medium 21, and receiver 42 is also optically coupled to a separate waveguide medium. Waveguide medium 21 may be an optical fiber, an air gap, or other suitable waveguide device for transmitting lightwave signals. Each link shown in FIG. 4 includes pump lasers optically coupled through a coupling element to each span of dispersion managed fiber with distributed amplification for pumping the entire span of fiber to counteract at least the minimum intrinsic loss in the fiber.

The first link includes a span of unitary dispersion managed fiber with distributed amplification 26 to which both a pump laser 24 is optically coupled through a coupler 22 for co-directional pumping of the transmitted signal and a pump laser 32 is optically coupled through coupler 28 for contra-directional pumping of the transmitted signal. The second link includes a span of dispersion managed fiber with distributed amplification 34 to which both pump laser 32 is optically coupled through coupler 30 for co-directional pumping of the transmitted signal and pump laser 36 is optically coupled through couple 38 for contra-directional pumping of the transmitted signal. Although a single pump laser 32 is shown as providing co-directional pumping for one link and contra-directional pumping for another link, it will be understood that separate pump lasers could achieve these two functions.

In one embodiment, each of the pump lasers provide pumping to stimulate emission from rare-earth dopant such as erbium in the waveguide fiber. In an alternative embodiment, the pump lasers could provide pumping to provide Raman amplification. Additional pump lasers could be utilized to provide both amplification from stimulated emission from erbium or Raman amplification. It will be understood that the present invention is not limited to a particular pumping arrangement.

The pump lasers are selected to provide a pump wavelength for achieving amplification at the wavelength of the transmitted lightwave signal in the sequence of the spans of amplifying dispersion managed fiber. Dispersion managed fibers dilutely doped with erbium, for example, require a pump signal in the wavelength range of about 980 nm or 1480 nm to amplify a lightwave signal in the range of about 1530 nm to 1620 nm. A pump signal of 1480 nm is preferred to minimize passive loss of the fiber which is lower than a pump signal at 980 nm. It will be understood that amplification could also be achieved by the Raman effect when the wavelength separation between the pump signal and the transmitted lightwave signal is properly selected. The amount of Raman gain achieved is directly proportional to the amount of pump power supplied to the fiber. The present invention also includes a system where distributed amplification is provided by Raman amplification alone.

For embodiments in which amplification is provided by Raman amplification, it is preferred that waveguide fiber has a smaller effective area than fibers in which distributed erbium amplification is utilized. In dispersion managed fibers with erbium doped distributed amplification, the effective area of the fiber may be larger than 50 square microns. In embodiments utilizing Raman amplification, preferably the effective area of the dispersion managed fiber is less than about 50 square microns, more preferably less than about 30 microns. The smaller effective area for soliton transmission is preferred because Raman amplification is intensity dependent, and larger effective area waveguide fibers will have lower pump power intensity. Soliton transmission is preferred in systems utilizing waveguide fibers having effective area less than 50 square microns because the smaller effective area fibers have higher signal intensity leading to more problems with nonlinearities such as four wave mixing. Solitons are less susceptible to nonlinearities than the NRZ format.

The present invention provides the advantages of a fiber having distributed amplification and reduced four wave mixing power penalty in comparison to prior waveguide fiber designs. At the same time, the desired features of high performance waveguide fibers are preserved, e. g., low attenuation, large effective area, and improved resistance to macrobending and microbending loss. The large effective area of the alternating sections of positive and negative dispersion provides an additional degree of freedom in amplification optimization. For example, in each alternating section, the dopant inversion level, concentration and gain in each section of positive and negative dispersion can be set independently.

To appreciate the advantages of this feature one needs an understanding of the gain from rare earth-doped amplification which is determined by what is known as the Golden Rule:

$$GdB = L[(g^* + \alpha)<n2> - \alpha]$$

where GdB is the amplifier gain in dB, L is the fiber length, $g^*$ is the fully inverted gain coefficient, $\alpha$ is the small signal loss coefficient due to the dopant ions and $<n2>$ average inversion parameter. $g^*$ and $\alpha$ are intrinsic, measurable properties of the fiber dependent on the signal wavelength and determined by the doping level. The average inversion is determined by the signal and pump powers and their wavelengths.

The Golden rule can overly constrain propagation through a distributed amplifier. For example, the distributed erbium doped fiber amplifier length, L, is usually predetermined, especially for an existing network upgrade.

Additionally, if wavelength division multiplexed transmission is desired, there exists an optimum design inversion level, $<n2>$, for gain flatness. Because the total system is optically transparent, GdB=0. From the Golden rule, the erbium-doping concentration, $g^*$ and $\alpha$ parameters become fixed. The potential drawback is that once the dopant level is determined, its effect on signal power excursion is fixed. One can not independently design an optimum power excursion for stable transmission. In other words, the parameter space for signal transmission optimization is limited.

However, in a dispersion managed link, there are more degrees of freedom. The erbium doping concentration and length of each alternating fiber section can be set independently while keeping the cumulative gain zero through the total dispersion managed fiber with distributed amplification link. In one example, gain could be larger in sections of fiber having larger effective area to minimize the cumulative effects of optical nonlinearity.

A second example could include alternating shorter sections optimized for amplification and longer sections optimized for reduced signal distortion. In one embodiment, the shorter sections would be designed to have higher loss, especially when the section is co-doped with alumina and has a smaller effective area for better pump light/erbium overlap. In this embodiment, the longer sections would be designed to have lower loss and larger effective area. The total link of the shorter and longer sections would be designed to have a net zero dispersion but lower cumulative loss and higher effective area than standard systems having distributed amplifiers. Thus, having alternating fiber sections introduces two new parameters for optimizing amplification and propagation.

Providing distributed amplification in a dispersion managed fiber link also optimizes soliton propagation in the transmission system. Soliton transmission through dispersion-managed fiber has recently been found to lower the Gordon-Haus timing jitter and increase the signal-to-noise ratio. It has even been possible to transmit solitons along standard single mode fiber at 1550 nm using dispersion-compensating fiber. While this technique has allowed larger amplifier spacing before the onset of soliton instability, the addition of distributed amplification would improve these results further. As discussed above, an example of a soliton transmission system would include distributed amplification only in the transition sections of the waveguide fiber.

Solitons are formed in constant dispersion fiber by the local balance of self phase modulation and fiber dispersion. As the pulse propagates along the fiber, dispersion creates an optical phase variation across the pulse resulting in frequency chirp. The sign of the frequency chirp in anomalous dispersion fiber, i.e., D (ps/nm-km)>0, is opposite to that generated by the fiber nonlinearity known as self phase modulation. The sign of the frequency chirp in normal dispersion fiber, i.e., D (ps/nm-km)<0, is the same to that generated by the fiber nonlinearity known as self phase modulation. So balancing of these two effects and cancellation of the frequency chirp only occurs for anomalous dispersion. Complete cancellation occurs at a single channel power level and results in temporal and spectral invariance.

Figure 5A:
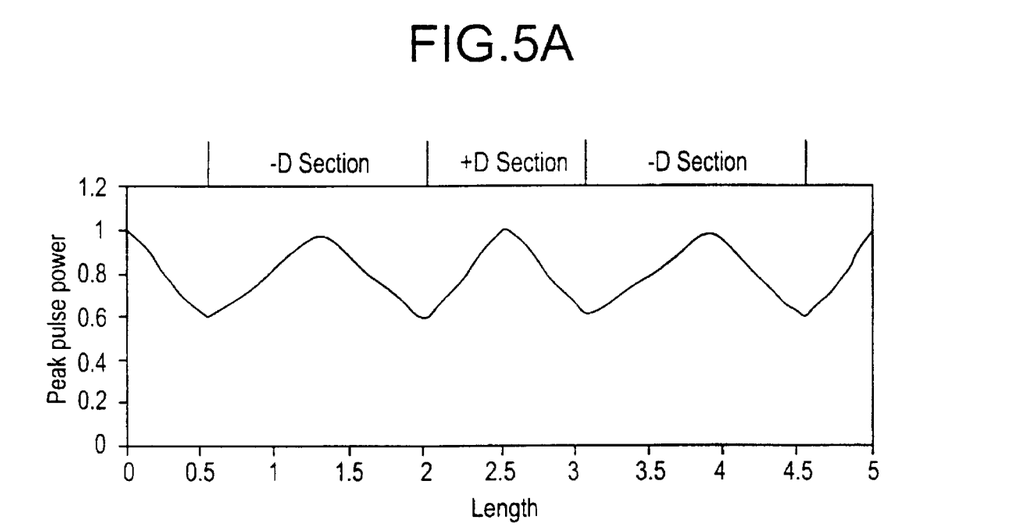
FIGS. 5a and 5b are respectively graphs of peak pulse power versus length and pulse width versus length of a soliton signal transmitted in a dispersion managed waveguide fiber.
Figure 5B:
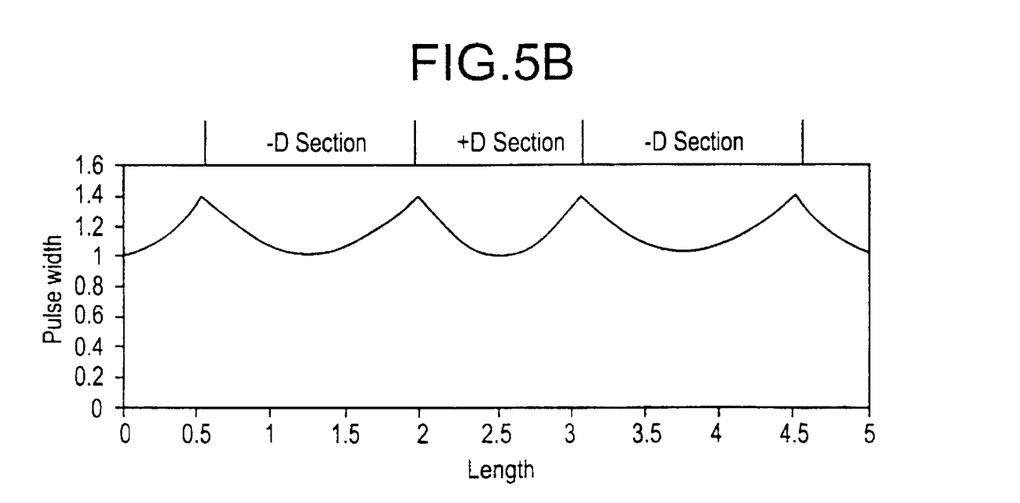

By contrast, pulse transmission through dispersion managed fiber is neither temporally nor spectrally invariant. The pulse reacts to the large local dispersion as seen in FIGS. 5a and 5b. It undergoes periodic oscillations in its pulse width and spectral bandwidth. The temporal width is minimized at the midpoints of every positive or negative dispersion section and maximized at the transitions between the sections. On the other hand, the spectral oscillations achieve a maximum at the midpoint of the positive dispersion sections and minimum at the midpoint of the negative dispersion sections. In addition to the reaction of the pulse to the large local dispersion changes, self phase modulation acts on a global distance scale to maintain the overall periodicity of the pulse evolution. The asymmetric nature of the pulse bandwidth means that the self phase modulation is stronger in the positive dispersion sections where the bandwidth is larger than the negative dispersion sections. By selectively amplifying only the positive dispersion sections, more self phase modulation is generated, allowing for more compensation of the negative dispersion in the negative dispersion sections. This dispersion/self phase modulation balance allows propagation not only throughout the positive dispersion region but also for negative average dispersion below about −0.05 ps/nm-km, extending the wavelength range over which solitons can transmit and providing more channels for WDM.

Pulse transmission over a wider range of positive and negative dispersion values would be beneficial for increasing the operating wavelength range for wavelength-division multiplexed RZ applications. One embodiment of the present invention would preferentially dope the positive dispersion sections of fiber. Preferential amplification in these sections would increase the effects of self-phase modulation further to allow stable signal transmission at even larger values of negative dispersion. This would allow more wavelength channels within an increased operating wavelength bandwidth.

FIGS. 5a and 5b illustrate the breathing nature of a pulse in dispersion-managed fiber. FIG. 5a plots the width of the pulse in normalized units as a function of fiber length in normalized units; FIG. 5b plots the corresponding peak intensity of the pulse in normalized units as a function of fiber length in normalized units. The terms "+D Sections" and "−D sections" refer to sign of the local dispersion in that section of fiber. The vertical lines above each Figure separating the "+D sections" and "−D sections" denote the interface or transitional region (discrete in this case) between the positive and negative dispersion fiber. Note that both the pulse width and its intensity are periodic functions of length with the same period as the fiber dispersion map. They are coupled together and have an asymmetrical relationship. At the midpoints and interface of either dispersion section, these parameters reach extreme values, wherein the pulse width has a minimum at the midpoints and maximum at the interface; the peak power has a maximum at the midpoints and minimum at the interface. These periodic pulse oscillations are due to the perturbing effects of the high local dispersion. The nonlinearity, self phase modulation, is needed to keep the pulse stable over longer lengths. It is the high local dispersion and resulting breathing characteristic that leads to beneficial pulse transmission both for a single and multiple wavelengths.

A properly designed fiber, wherein amplification within each dispersion managed fiber section is correctly chosen, would control pulse width oscillations. Because the oscillations are due to a mismatch between pulse self-phase modulation and fiber dispersion, they can be brought into better balance by controlling the peak intensity of the pulse through distributed amplification. Lower fluctuations in pulse width and intensity should also translate into increased tolerance to amplifier spacing variations.

As mentioned previously, it is also contemplated that in accordance with the present invention, amplification could be achieved by Raman amplification. One advantage of Raman amplification is that there is no excess absorption, and thus loss, due to the dopants in the waveguide fiber. Thus, according to the present invention, either amplification through the addition of a rare-earth dopant such as erbium, or Raman amplification or a combination of both be used for distributed amplification.

An operating wavelength range of particular interest is that from about 1285 nm to 1620 nm, a range which includes the low attenuation operating window around 1550 nm. However, one skilled in the art will recognize that the invention is not restricted to this particular wavelength range.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. A unitary dispersion managed optical waveguide fiber for transmitting an optical signal over a transmission wavelength range comprising:

a core glass region having a refractive index profile, surrounded by a clad glass layer having a refractive index $n_c$ lower than at least a portion of the refractive index profile of said core glass region, said waveguide fiber having a total dispersion, which changes in sign from positive to negative and negative to positive along the length of said waveguide, said waveguide fiber including sub-lengths $I_i$ having a positive total dispersion over the transmission wavelength range and sub-lengths $I_j$ having a negative total dispersion over the transmission wavelength range, wherein at least one of the sub-lengths $I_i$ or $I_j$ contains a dilute concentration of rare-earth dopant ions sufficient to provide amplification of the transmission wavelengths by stimulated emission.

2. The dispersion managed waveguide fiber of claim 1, wherein said fiber further includes transition sub-lengths, $I_t$, over which the total dispersion changes from positive to negative or negative to positive.

3. The dispersion managed waveguide fiber of claim 1, wherein the average of the absolute magnitudes of the dispersion of the positive dispersion sub-lengths is greater than 0.5 ps/nm-km and the average of the absolute magnitudes of the dispersion of the negative dispersion sub-lengths is greater than 0.5 ps/nm-km at the transmission wavelength range.

4. The dispersion managed waveguide fiber of claim 1, wherein the transmission wavelength range exceeds 4 nm.

5. The dispersion managed waveguide fiber of claim 1, wherein the transmission wavelength range exceeds 20 nm.

6. The dispersion managed waveguide fiber of claim 1, wherein said rare-earth dopant ions include erbium.

7. The dispersion managed waveguide fiber of claim 3, wherein said rare-earth dopant ions include erbium.

8. The dispersion managed waveguide fiber of claim 3, wherein the radial location of the rare-earth dopant ions in the positive dispersion sub-lengths $I_i$ is different from the radial location of the dopant ions in the negative dispersion sub-lengths $I_j$.

9. The dispersion managed waveguide fiber of claim 2, wherein the concentration of said dopant ions is substantially uniform over the length of said waveguide fiber.

10. The dispersion managed waveguide fiber of claim 1, wherein only positive dispersion sub-lengths $I_i$ contain said rare-earth dopant ions.

11. The dispersion managed waveguide fiber of claim 10, wherein soliton transmission in the waveguide fiber is improved when dispersion of the transmitted wavelength is less than about −0.05 ps/nm-km.

12. The dispersion managed waveguide fiber of claim 1, wherein only negative dispersion sub-lengths $I_j$ contain said rare-earth dopant ions.

13. The dispersion managed waveguide fiber of claim 2, wherein only sub-lengths $I_t$ contain said rare-earth dopant ions.

14. The dispersion managed waveguide fiber of claim 13, wherein the waveguide fiber is designed for use in a telecommunication system using soliton signal pulses.

15. The dispersion managed waveguide fiber of claim 14, wherein stimulation of said dopant ions causes amplification of said signal pulses so that the peak intensity of said signal pulses is controlled to control oscillations of the pulse width.

16. The dispersion managed waveguide fiber of claim 14, wherein amplification in the transition sub-lengths $I_t$ is designed to reduce pulse timing jitter in soliton transmission systems.

17. The dispersion managed waveguide fiber of claim 1, wherein the refractive index profile of sub-lengths $I_i$ is different from the refractive index profile of sub-lengths $I_j$, and the radial position of the dopant ions in sub-lengths $I_i$ is different from the radial position of the dopant ions in sub-lengths $I_j$.

18. The dispersion managed waveguide fiber of claim 1, wherein the dispersion slope in the positive dispersion sub-length $I_i$ is positive and the dispersion slope in the negative dispersion sub-length $I_j$ is negative.

19. An optical system for transmitting a first lightwave signal over a first transmission wavelength range comprising, a unitary dispersion managed optical waveguide fiber including a core glass region having a refractive index profile, surrounded by a clad glass layer having a refractive index $n_c$ lower than at least a portion of the refractive index profile of said core glass region, said waveguide fiber having a total dispersion, which changes in sign from positive to negative and negative to positive along the length of said waveguide, said waveguide fiber including sub-lengths $I_i$ having a positive total dispersion over the transmission wavelength range and sub-lengths $I_j$ having a negative total dispersion over the transmission wavelength range, wherein at least one of the sub-lengths $I_i$ or $I_j$ contains a dilute concentration of rare-earth dopant ions sufficient to provide amplification of the transmission wavelengths by stimulated emission; and a first pump source at a second wavelength for stimulating emission from said dopant ions at said first wavelength, said first pump source being optically coupled to said optical waveguide fiber.

20. The optical system of claim 19, wherein said fiber further includes transition sub-lengths, $I_t$, over which the total dispersion changes from a value in the first range of dispersion values to a value in the second range of dispersion values.

21. The optical system of claim 19, wherein the average of the absolute magnitudes of the dispersion of the positive dispersion sub-lengths is greater than 0.5 ps/nm-km and the average of the absolute magnitudes of the dispersion of the negative dispersion sub-lengths is greater than 0.5 ps/nm-km at the transmission wavelength range.

22. The optical system of claim 19, wherein the transmission wavelength range exceeds 4 nm.

23. The optical system of claim 19, wherein the transmission wavelength range exceeds 20 nm.

24. The optical system of claim 19, wherein said rare earth dopant ions include erbium.

25. The optical system of claim 22, wherein said rare earth dopant ions include erbium.

26. The dispersion managed waveguide fiber of claim 19, wherein the radial location of the rare-earth dopant ions in the positive dispersion sub-lengths $I_i$ is different from the radial location of the dopant ions in the negative dispersion sub-lengths $I_j$.

27. The optical system of claim 19, wherein only positive dispersion sub-lengths $I_i$ contain said rare-earth dopant ions.

28. The optical system of claim 27, wherein stimulated emission of said rare-earth dopant ions in the positive dispersion sub-lengths Ij improves signal transmission in a dispersion range less than about −0.05 ps/nm-km.

29. The optical system of claim 14, wherein only negative dispersion sub-lengths $I_j$ contain said rare-earth dopant ions.

30. The optical system of claim 19, wherein the refractive index profile of sub-lengths $I_i$ is different from the refractive index profile of sub-lengths $I_j$, and the radial position of the dopant ions in sub-lengths $I_i$ is different from the radial position of the dopant ions in sub-lengths $I_j$.

31. The optical system of claim 20, wherein only sub-lengths $I_t$ contain said rare-earth dopant ions.

32. The optical system of claim 31, wherein the waveguide fiber is designed for use in a telecommunication system using soliton signal pulses and stimulated emission from said rare earth dopant ions causes amplification in the transition sub-lengths $I_t$.

33. The optical system of claim 32, wherein stimulation of said dopant ions causes amplification of said signal pulses so that the peak intensity of said signal pulses is controlled to prevent oscillations of the pulse width.

34. The optical system of claim 19, wherein the dispersion slope in the positive dispersion section $I_i$ is positive and the dispersion slope in the negative dispersion section $I_j$ is negative.

35. The optical system of claim 19, further comprising a second pump source at a third wavelength for stimulating Raman scattering, said second pump source being optically coupled to said waveguide fiber.

36. An optical system for transmitting a first lightwave signal over a first wavelength range comprising, a unitary dispersion managed waveguide fiber including a core glass region having a refractive index profile, surrounded by a clad glass layer having a refractive index $n_c$ lower than at least a portion of the refractive index profile of said core glass region, said waveguide fiber having a total dispersion, which changes in sign from positive to negative and negative to positive along the length of said waveguide, said waveguide fiber including sub-lengths $I_i$ having a positive total dispersion over the transmission wavelength range and sub-lengths $I_j$ having a negative total dispersion over the transmission wavelength range; and a first pump source at a second wavelength for causing amplification by Raman scattering of said lightwave signal at said first wavelength, said first pump source being optically coupled to said optical waveguide fiber.

37. The optical system of claim 36, wherein said fiber further includes transition sub-lengths, $I_t$ over which the total dispersion changes from a value in the first range of dispersion values to a value in the second range of dispersion values.

38. The optical system of claim 37, wherein said fiber has an effective area less than about 50 square microns.

39. The optical system of claim 37, wherein said fiber has an effective area less than about 30 square microns.

* * * * *

UNITED STATES PATENT AND TRADEMARK OFFICE
CERTIFICATE OF CORRECTION

PATENT NO. : 6,404,964 B1
DATED : June 11, 2002
INVENTOR(S) : Bhagavatula Venkata A. et al.

It is certified that error appears in the above-identified patent and that said Letters Patent is hereby corrected as shown below:

<u>Column 15,</u>
Line 14, "index n, lower than at least a portion of the refractive", should be
-- index $n_c$ lower than at least a portion of the refractive --

<u>Column 16,</u>
Line 2, "wherein stimulation of said. dopant ions causes amplifica-", should be
-- wherein stimulation of said dopant ions causes amplifica- --
Line 7, "wherein amplification in the transition sub-lengths $I_j$ is", should be -- wherein amplification in the transition sub-lengths $I_t$ is --

<u>Column 17,</u>
Line 3, "dispersion sub-lengths Ij improves signal transmission in a", should be
-- dispersion sub-lengths $I_j$ improves signal transmission in a --

Signed and Sealed this

Fourth Day of March, 2003

JAMES E. ROGAN
*Director of the United States Patent and Trademark Office*